US012638579B2

(12) United States Patent
El Ozeir et al.

(10) Patent No.: US 12,638,579 B2
(45) Date of Patent: May 26, 2026

(54) RADAR POWER CALIBRATION WITH MISMATCH COMPENSATION

(71) Applicant: NXP B.V., Eindhoven (NL)

(72) Inventors: Mohamad El Ozeir, Toulouse (FR); Cristian Pavao Moreira, Frouzins (FR); Pierre Pascal Savary, Leguevin (FR)

(73) Assignee: NXP B.V., Eindhoven (NL)

( * ) Notice: Subject to any disclaimer, the term of this patent is extended or adjusted under 35 U.S.C. 154(b) by 472 days.

(21) Appl. No.: 18/498,152

(22) Filed: Oct. 31, 2023

(65) Prior Publication Data

US 2024/0219561 A1     Jul. 4, 2024

(30) Foreign Application Priority Data

Dec. 30, 2022    (EP) ..................................... 22307072

(51) Int. Cl.
*G01S 13/931*        (2020.01)
*G01S 7/40*          (2006.01)

(52) U.S. Cl.
CPC .......... *G01S 13/931* (2013.01); *G01S 7/4021* (2013.01)

(58) Field of Classification Search
CPC .... G01S 13/931; G01S 7/4021; G01S 7/4013; G01R 35/005; G01R 21/00
See application file for complete search history.

(56) References Cited

U.S. PATENT DOCUMENTS

| | | | | |
|---|---|---|---|---|
| 5,117,505 A | * | 5/1992 | Talwar ................... | H04B 1/126 |
| | | | | 455/278.1 |
| 6,960,956 B2 | * | 11/2005 | Pehlke .................... | H03F 1/345 |
| | | | | 455/127.1 |
| 7,383,026 B1 | * | 6/2008 | Detch .................. | H01Q 3/2647 |
| | | | | 340/10.1 |
| 7,417,740 B2 | * | 8/2008 | Alphonse ............. | G01B 9/0205 |
| | | | | 356/497 |
| 7,911,277 B2 | | 3/2011 | Paul et al. | |
| 8,022,688 B2 | | 9/2011 | You | |
| 8,674,782 B2 | | 3/2014 | Keese et al. | |
| 9,209,839 B2 | | 12/2015 | Rozenblit et al. | |
| 9,484,962 B1 | * | 11/2016 | Magesacher ......... | H04B 1/0475 |

(Continued)

OTHER PUBLICATIONS

Cohen, E., "Accurate Power Detector and Dual Directional Coupler with Self-Calibration in 65nm CMOS", Proceedings of the 10th European Microwave Integrated Circuits Conference, Sep. 7-8, 2015.

*Primary Examiner* — Dominic E Rego

(57)        ABSTRACT

A first input signal that corresponds to an output transmitted signal of a power amplifier of a vehicle radar system is received and the output power level of the transmitted signal is calibrated to optimize quality of the transmitted signal at the antenna reference plane (ARP). The proposed calibration method and apparatus allows to improve the output power calibration accuracy at ARP by compensating for reflected power at power amplifier output. The proposed apparatus uses the coupled and the isolated outputs of a bi-directional coupler to compensate the mismatch between the output of the power amplifier and the ARP; detectors at both coupler outputs measure both powers (coupled, isolated output) and apply respective correction on the calibration target to compensate for reflected power.

20 Claims, 6 Drawing Sheets

200

(56) References Cited

U.S. PATENT DOCUMENTS

| | | | |
|---|---|---|---|
| 9,634,776 B1* | 4/2017 | Hsu | H04B 17/103 |
| 10,651,794 B1* | 5/2020 | Lin | H03D 7/1441 |
| 2003/0092410 A1* | 5/2003 | Rahman | H03G 3/001 |
| | | | 455/234.1 |
| 2005/0215214 A1* | 9/2005 | Moorti | H04B 1/1027 |
| | | | 455/193.1 |
| 2006/0022875 A1* | 2/2006 | Pidwerbetsky | H01Q 1/243 |
| | | | 343/700 MS |
| 2006/0140573 A1* | 6/2006 | Kim | H04B 1/0483 |
| | | | 385/147 |
| 2007/0187617 A1* | 8/2007 | Kong | G01N 33/2888 |
| | | | 250/461.1 |
| 2014/0057684 A1 | 2/2014 | Khlat | |
| 2014/0132355 A1* | 5/2014 | Dupuis | H03F 1/52 |
| | | | 228/180.5 |
| 2014/0167975 A1 | 6/2014 | Smith | |
| 2014/0210558 A1* | 7/2014 | Matsumoto | H03F 1/0272 |
| | | | 330/296 |
| 2016/0209494 A1* | 7/2016 | Mazzaro | G01S 7/35 |
| 2017/0033461 A1* | 2/2017 | Mohajer Jasebi | H01Q 1/2291 |
| 2017/0264077 A1* | 9/2017 | Chacinski | H01S 5/026 |
| 2017/0277141 A1* | 9/2017 | Sekitsuka | G04R 20/10 |
| 2019/0138768 A1* | 5/2019 | Leland | G06K 7/10118 |
| 2020/0007092 A1* | 1/2020 | Wang | H03F 3/19 |
| 2020/0027294 A1* | 1/2020 | Schat | G07C 9/00309 |
| 2020/0044612 A1* | 2/2020 | Bologna | H03F 1/0233 |
| 2020/0059203 A1* | 2/2020 | Thuries | H03F 1/52 |
| 2020/0099258 A1* | 3/2020 | Arnitz | H02J 50/90 |
| 2021/0073488 A1* | 3/2021 | Turner | G06K 19/07766 |
| 2021/0249996 A1* | 8/2021 | Banerjee | H03F 1/3211 |
| 2022/0006428 A1* | 1/2022 | Shepphard | H03F 1/0266 |
| 2022/0175318 A1* | 6/2022 | Fujisaki | H01R 13/5804 |
| 2023/0184889 A1* | 6/2023 | Fiore | G01S 7/4069 |
| | | | 342/169 |
| 2024/0030929 A1* | 1/2024 | Tabarani | H03M 1/002 |
| 2024/0142335 A1* | 5/2024 | Masterson | G01N 21/3504 |

* cited by examiner

RADAR POWER CALIBRATION WITH MISMATCH COMPENSATION

CROSS-REFERENCE TO RELATED APPLICATIONS

This application claims the priority under 35 U.S.C. § 119 of application no. 22307072.3, filed on 30 Dec. 2022, the contents of which are incorporated by reference herein.

TECHNICAL FIELD

The embodiments of the present disclosure relate to radar systems and methods of their operation and, more specifically, to systems and methods for calibrating a power level of an output signal of a vehicle radar system.

BACKGROUND

A radar system transmits an electromagnetic signal and receives back reflections of the transmitted signal. The time delay between the transmitted and received signals can be determined and used to calculate the distance and/or the speed of objects causing the reflections. For example, in automotive applications, radar systems can be used to determine the distance and/or the speed of oncoming vehicles and other obstacles.

To ensure proper operation of a vehicle radar system it can be desirable to calibrate the power of the electromagnetic signals being transmitted by the system to a desired power level. A typical calibration procedure can involve several stages of electronic components cooperating to adjust the power level; ultimately, the goal is for the radar transmitter to emit signals at a power level as close as possible to the calibration target. Ensuring an accurate output power is very important for the radar performance and adherence to safety standards in automotive radar applications. For example, some countries restrict maximum output power to a certain level, and calibration allows the radar system to satisfy the restriction.

However, existing calibration techniques suffer from over-calibration in order to reach the target output power level; this unnecessarily increases current consumption and sensor power dissipation, among other costs. One cause of over-calibration is that power measurements can be taken at the output of a power amplifier, but the mismatch between this output and the antenna reference plane (ARP) is not considered in the calibration process; consequently, the system must either expend resources in pursuit of accuracy at the ARP, or forego compensation and accept the degraded accuracy resulting from the mismatch. An efficiently effective calibration procedure for ensuring accurate calibration of the output power at the ARP is needed.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1A:
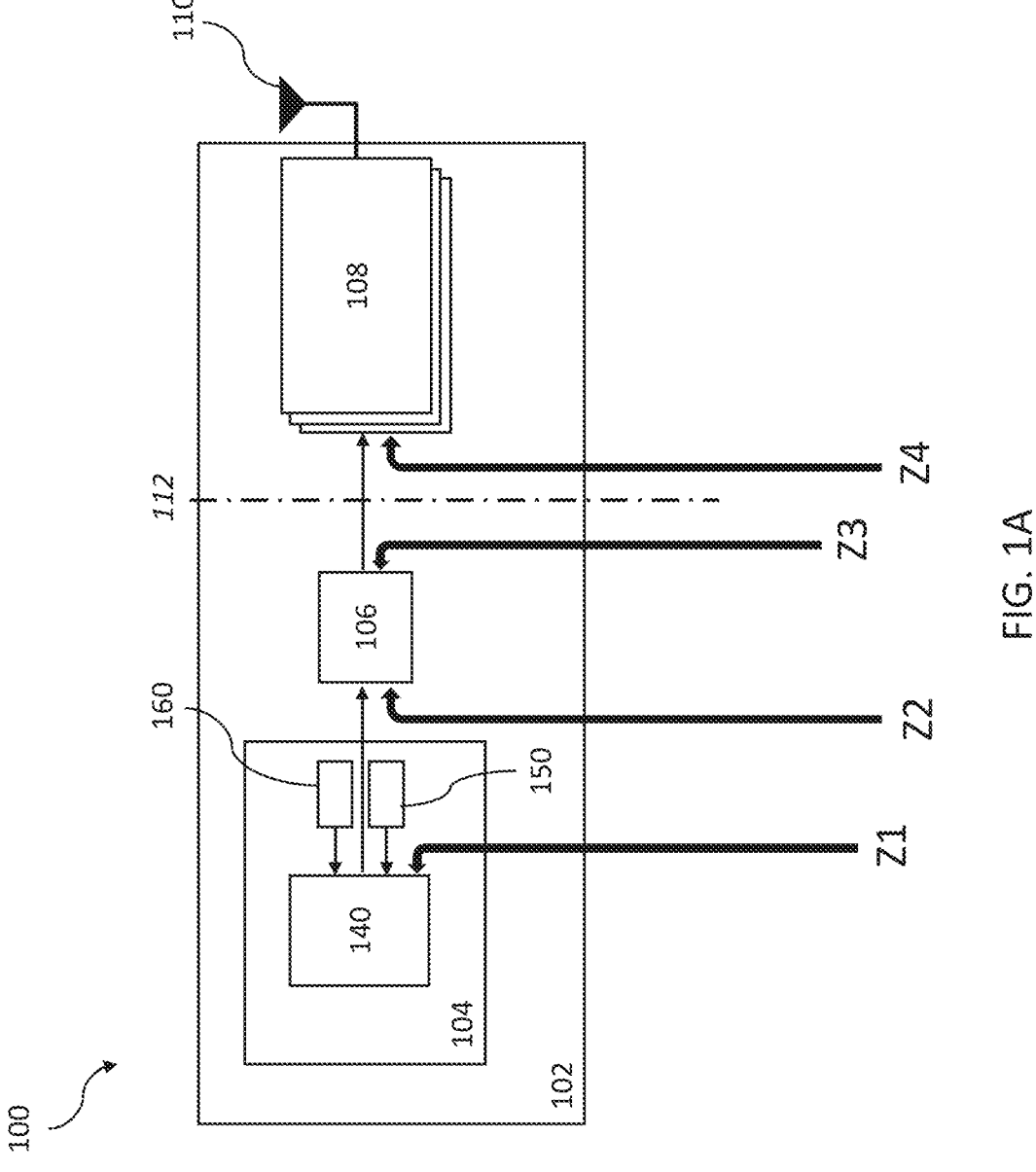
FIGS. 1A and 1B are block diagrams depicting functional components and calibrated power measurements for a radar transmitter in a radar system.

It will be readily understood that the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

For simplicity, the described features, advantages, and characteristics of the invention are described throughout this specification may be described as being implemented within a radar transmitter disposed on a printed circuit board or other substrate, and including integrated circuits as well as individual circuit components and other pieces of electronic equipment, but the present devices and methods may be implemented in other transmission systems and devices suitable for use in vehicle and otherwise-portable radar systems.

The present disclosure provides a system and method for optimizing the operation of a radar device, such as a vehicle radar system, by accurately calibrating the output power of a radar transmitter to a target level at the antenna reference plane (ARP). Specifically, the system and method may be configured to measure both incident and reflected power at the output of a transmit power amplifier of the radar transmitter, and adjust the output power of the power amplifier (and, consequently the signals transmitted by the radar device) to reach a calibration target that compensates for mismatch in the radar transmitter.

In general, the embodiments described herein provide for calibration of a radar system's transmit power to a target level at the ARP with greater accuracy by adjusting a calibration target voltage and driving the power amplifier at a correspondingly adjusted supply voltage, to compensate for mismatch between the power amplifier output and the ARP. Embodiments of the systems and methods herein use peak-to-peak detectors at both the coupled and the isolated outputs of a bi-directional coupler connected to the power amplifier output. At the coupled output, the incident power is measured by measuring the output voltage of a connected PPD; this measurement is used to perform an initial calibration of the output power. The calibrated output power is supplied to the bi-directional coupler; at the isolated output, the reflected power is measured by measuring the output voltage of a connected PPD. This measurement is used to update the calibration target and perform a recalibration of the output power to produce a transmission signal at a calibrated and mismatch-compensated output power level. As such, the embodiments of the present disclosure can provide improved operation of a vehicle radar system with more precise power level control and less calibration overhead. A further feature of the present systems and methods is that they are adaptable to compensate for variations in both load and antenna/transmitter packages.

Figure 1B:
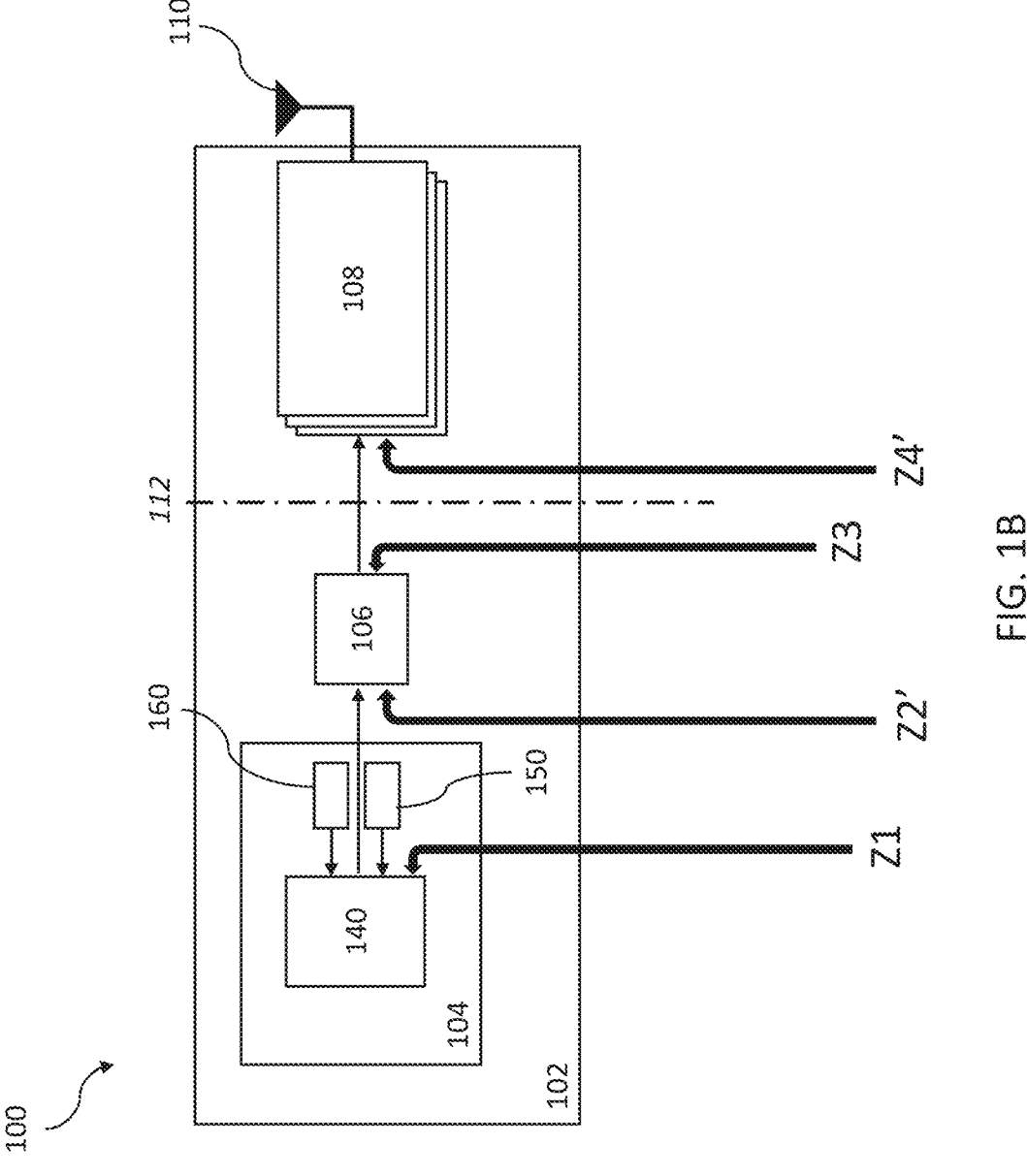

FIGS. 1A and 1B illustrate an example vehicle radar system 100 in accordance with the present disclosure (when incorporated into a vehicle, vehicle radar system 100 may sometimes be referred to as a vehicle radar subsystem). Vehicle radar system 100 includes at least one radar transmitter 102, and may include additional apparatus that are not pictured, such as one or more radar receivers, controllers and control circuitry, system integration packages, and the like. The radar transmitter 102 may include an integrated circuit 104, such as a system-on-chip, that comprises the radar transmitter's 102 native transmission circuitry, described further below. The radar transmitter 102 may further include a transition package 106 comprising circuitry that enables installation of one or more antennas 108 (e.g., internal antennas and/or external antennas 110, and connection components) into the radar transmitter 102. The transition package 106 thus may serve as an interface between the native transmission circuitry (i.e., within the integrated circuit 104 created and installed by the radar transmitter 102 manufacturer) and the aftermarket circuitry (i.e., antenna(s) 108 and connection components installed by the manufacturer's customer).

The integrated circuit 104 includes a transmission signal section 140 comprising circuitry for producing a transmission signal at a controllable output power level. Generally, this circuitry may include a suitable microcontroller as well as suitable input and output buffers, voltage regulators, power amplifiers, couplers, peak-to-peak detectors (PPDs)

and other detectors/sensors, and the like. The integrated circuit 104 further includes power measurement devices for measuring output power: a first measurement device 150 measures incident power; and, a second measurement device 160 measures reflected power. The measurement devices 150, 160 may each provide feedback signals to the transmission signal section 140 (i.e., to a microcontroller) for the purpose of performing the calibration procedures herein. The measurement devices 150, 160 may be any suitable sensor or detector arrangement that can be configured to measure characteristics of the output signal, such as current, voltage, etc.

The present disclosure pertains to calibration of the output power of the transmission signal delivered from the transmission signal section 140 to the transition package 106 and from the transition package 106 to the antenna(s) 108. The transmission signal path intersects the ARP 112, represented for simplicity by a dotted line disposed between the transition package 106 and the antenna(s) 108. The ARP 112 is located, in physical space, a fixed distance from the signal output of the transmission signal section 140 (e.g., from an output port of a power amplifier). The output power is calibrated relative to the ARP 112, however the power characteristics cannot be measured precisely at the location of the ARP 112 and are instead measured indirectly by the measurement devices 150, 160 in the integrated circuit 104.

FIG. 1A illustrates an ideal calibration condition, where there is no reflected power; in this condition, the impedance Z1 at the output of the transmission signal section (e.g., at the output terminal of a power amplifier) and the impedance Z2 at the input of the transition package 106 are matching the optimal large signal impedance, and the output impedance Z3 of the transition package 106 and the input impedance Z4 of the antenna(s) 108 are matched. Referring to FIG. 1B, in practice the actual impedance values Z2' and Z4' vary from their ideal values Z2 and Z4, creating impedance mismatch and, accordingly, reflection of a portion of the output power. The magnitude of the variation cannot be determined from the measurement of incident power alone. Thus, a second measurement device 160 provides a measurement of the reflected power back to the transmission signal section 140, where it is used to compensate the calibration target and account for mismatch between the components of the radar transmitter 102, as described further below.

Figure 2:
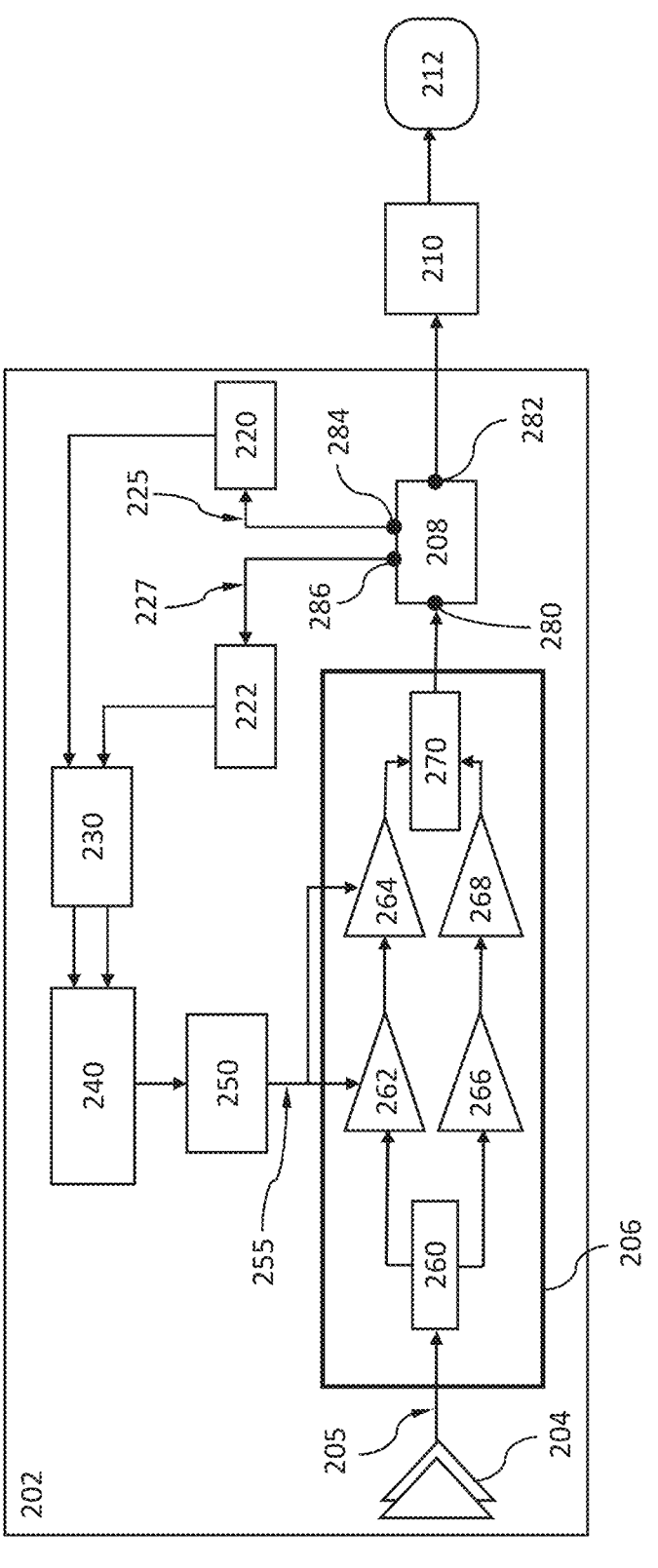
FIG. 2 is a circuit diagram depicting functional components of a radar transmitter in accordance with the present disclosure.

FIG. 2 illustrates an example embodiment of a radar transmitter 200, such as the radar transmitter 102 of FIGS. 1A-B. The radar transmitter 200 may include an output power calibration section 202 for producing the transmission signal at a calibrated output power. In various embodiments, the output power calibration section 202 may be implemented in one or more integrated circuits, as described above. Within the output power calibration section 202: a buffer section 204 comprising one or more input and output buffers provides calibrated input power 205 to an input of a power amplifier 206; the power amplifier 206 outputs the received signal with an amplified output power; a coupler 208 receives the output of the power amplifier 206, and outputs the corresponding transmission signal from the output power calibration section 202 to a transition package 210 as described above. In turn, the transmission signal passes to the ARP 212.

Power amplifier 206 may be the power amplifier of a vehicle radar system being calibrated (e.g., a power amplifier implemented within radar transmitter 102 of FIG. 1). Power amplifier 206 is configured to generate an amplified electromagnetic signal (e.g., a radar signal) that is output by power amplifier 206 as a transmitted signal. The output signal generated by power amplifier 206 is, effectively, the transmission signal; as such, a magnitude of the signal output by power amplifier 206 is the same as (or directly related to) the magnitude of the signal that will ultimately be output or transmitted by (a) transmit antenna(s) of the vehicle's radar system. In an example of the power amplifier 206, the calibrated input power 205 is received at a signal splitter 260 comprising circuitry to split an input signal into parallel signal channels: a first split signal is passed to a first driver 262 and output stage 264 combination; and, a second split signal is passed to a second driver 266 and output stage 268 combination. The drivers 262, 266 amplify the split signals, providing current and power gain in proportion to the amount of supply voltage. The outputs of the drivers 262, 266 are inputs to the output stages 264, 268, which provide further power gain of the input signal. A power combiner 270 receives the amplified split signals and combines them back into an amplified representation of the calibrated input power 205; the amplified signal is the output of the power amplifier 206, delivered to the input port 280 of the coupler 208.

The coupler 208 may be any suitable directional coupler(s) or a bi-directional coupler. The coupler 208 may be a four-port device, including at least one input port and at least one output port connected in the signal transmitter path. For example, the coupler 208 may receive the power amplifier 206 output signal at an input port 280 and conduct the signal over a first transmission line (not shown) to an output port 282 electrically connected to the transition package 210. The other two ports 284, 286 of the coupler 208 are connected by a second transmission line (not shown) and may serve as coupled and isolated ports. When the coupler 208 is a bi-directional coupler, the ports 284, 286 swap functionality depending on the direction of signal flow—when the signal passes from the input port 280 to the output port 282, the "coupled port" is port 284 and the "isolated port" is port 286. The second transmission line is coupled to the first transmission line such that a part of the signal received at the input port 280 and output at the output port 282 is also output at the coupled port 284. In other embodiments, the coupler 208 may comprise at least two directional couplers connected in parallel or in series, with one of the couplers connected in alignment with the transmission signal forward propagation, and another of the couplers connected in reverse alignment (i.e., aligned with the transmission signal reverse propagation). The coupler 208 may also be a dual directional coupler, with both a forward-coupled port and a reverse-coupled port each terminated to an internal load.

The coupler 208 may be implemented in any suitable manner so as to couple a portion of the differential output signal of power amplifier 206 into the power calibration mechanism of the radar transmitter 200. In various embodiments, the coupler 208 may be connected at any points in the transmit signal path of power amplifier 206 to the antenna (through ARP 212) or to any other power amplifiers in which the amplifier's output power level is to be calibrated. An example embodiment is shown in FIG. 2, in which a first detector is electrically connected to the coupled port 284 and is referred to herein as the "coupled detector" 220, and a second detector is electrically connected to the isolated port 286 and is referred to herein as the "isolated detector" 222. The detectors 220, 222 may, in some embodiments, serve as the measurement devices 150, 160, respectively, or as a component thereof, as described above with respect to FIGS. 1A-B. The coupled detector 220 may produce a measurement of the incident power based on a coupled output signal

225 received as input; and, the isolated detector 222 may produce a measurement of the reflected power based on an isolated output signal 227, as described herein.

The detectors 220, 222 may be any suitable power sensors that produce output signals representing their corresponding power measurements, for use in the calibration procedure. In some embodiments, the detectors 220, 222 may be PPDs that produce an output voltage corresponding to the input to the PPD. Thus the coupled detector 220 in electrical communication with the coupled port 284 of the coupler 208 may be configured to convert the coupled portion of the output signal of power amplifier 206 to a direct-current (DC) signal having a magnitude that is equal to or proportional to, or otherwise a function of, the magnitude of the peaks of the coupled output signal 225 generated by coupler 208. Further, a fraction of the incident output power from the power amplifier 206 will be reflected back in the opposite direction of the signal path in case of mismatch; a portion of the reflected power that appears on the first transmission line of the coupler 208 will be coupled to the second transmission line and will appear at the isolated port 286 as a measurable isolated output signal 227 that is proportional to the reflected power level. Thus, the isolated detector 222 in electrical communication with the isolated port 286 of the coupler 208 may be configured to convert the coupled portion of the reflected power to a differential direct-current (DC) signal having a magnitude that is equal to or proportional (or function of) to the magnitude of the peaks of the isolated output signal 227 generated by coupler 208.

In some embodiments, the coupler 208 may be configured so that the signal appearing at the isolated port 286 is facilitated, rather than attenuated. For example, the coupler 208 may be a bi-directional coupler, in which the coupled and isolated ports swap functions depending on the transmission signal direction. In some embodiments, the accuracy of the isolated detector 222 measurements may be limited by characteristics of the detector. For example, a PPD's dynamic range may reduce the accuracy of the measurement of reflected power in middle and low dynamic ranges. To correct an inaccuracy, the power calibration section 202 may include one or more buffers (not shown) between the isolated port 286 of the coupler 208 and the input of the isolated detector 222.

The outputs from the detectors 220, 222 are passed to one or more variable-gain amplifiers (VGA) 230. In some embodiments, a single VGA 230 receives both outputs by way of a controllable switch; alternatively, each output may be passed into a separate VGA 230. The VGA 230 is configured to amplify a DC input signal into a full-scale signal with minimum values equal to or approximately equal to a ground level and maximum values equal to or approximately equal to a power supply voltage of VGA 230. The amplified output signals of the detectors 220, 222 are then passed to a controller 240. The controller 240 may be any suitable microcontroller capable of performing the calibration procedures described herein. In particular, the controller 240 may be configured to receive the amplified detector 220, 222 output signals and analyze them to determine the measured incident power and reflected power levels. Further, the controller 240 may be configured to calculate a new calibration target based on the measured power levels, and to translate the calibration target to a supply voltage adjustment as described further below. The controller 240 may also electrically connect to a switch (not shown) that receives the outputs of the detectors 220, 222; responsive to control signals of the controller 240, the switch may switch whether the coupled detector 220 output or the isolated detector 222 output is passed into the VGA 230. Finally, the controller 240 may be configured to output control signals that cause a change in the supply voltage to components of the power amplifier 206, which in turn adjusts the power amplifier 206 output signal toward a desired (i.e., calibrated) output power level. Control logic may be stored in memory of the controller 240 and executed by the controller 240 to perform the calibration procedures described herein.

Memory (not shown) accessible by the controller 240 may also store data elements that are critical to performing power level calculations. In some embodiments, such as the illustrated radar transmitter 200 of FIG. 2, the controller 240 receives the output signals of the detectors 220, 222; these signals may, for example, be voltages, such as when the detectors 220, 222 are PPDs. The controller 240 may be configured to convert these output signals into measurements of incident power and reflected power at the ARP 212. While other data elements may be stored according to various implementations, in the illustrated example device 200, the data elements that will be used by the controller include: values for the coupling factor, directivity, isolation, and insertion loss of the coupler 208; a value for insertion loss of the transition package 210; and, the input-power-to-output-voltage transfer function of the PPDs. Using these values, the controller 240 may execute a model for transforming the received PPD output voltages into measured power levels at the PPDs' inputs, and the measured power levels to measurements of incident and reflected power at the ARP.

In various implementations, the controller 240 outputs control signals to control the operation of the power amplifier 206. A voltage regulator 250, such as a low drop-out regulator ("LDO") may be in electrical communication with one or more output ports of the controller 240, and also with one or more components of the power amplifier 206. In some embodiments, the voltage regulator 250 may provide a supply voltage 255 to a gain section of the power amplifier 206. The voltage regulator 250 may receive the control signals from the controller 240 and may adjust the supply voltage 255 according to the control signals; the supply voltage 255 value affects the amount of voltage and/or current gain, power gain, impedance fidelity, and other characteristics of the power amplifier 206 output. Thus, the controller 240 may execute the control logic to determine the incident and reflected power levels, adjust the calibration target accordingly, and then control the voltage regulator 250 to output a supply voltage 255 that will cause the drivers 262, 264 and output stages 264, 268 to produce a transmission signal with calibrated output power that compensates for mismatch between the power amplifier 206 and the transition package 210 and between the transition package 210 and the transmission antennas (not shown).

Figure 3:
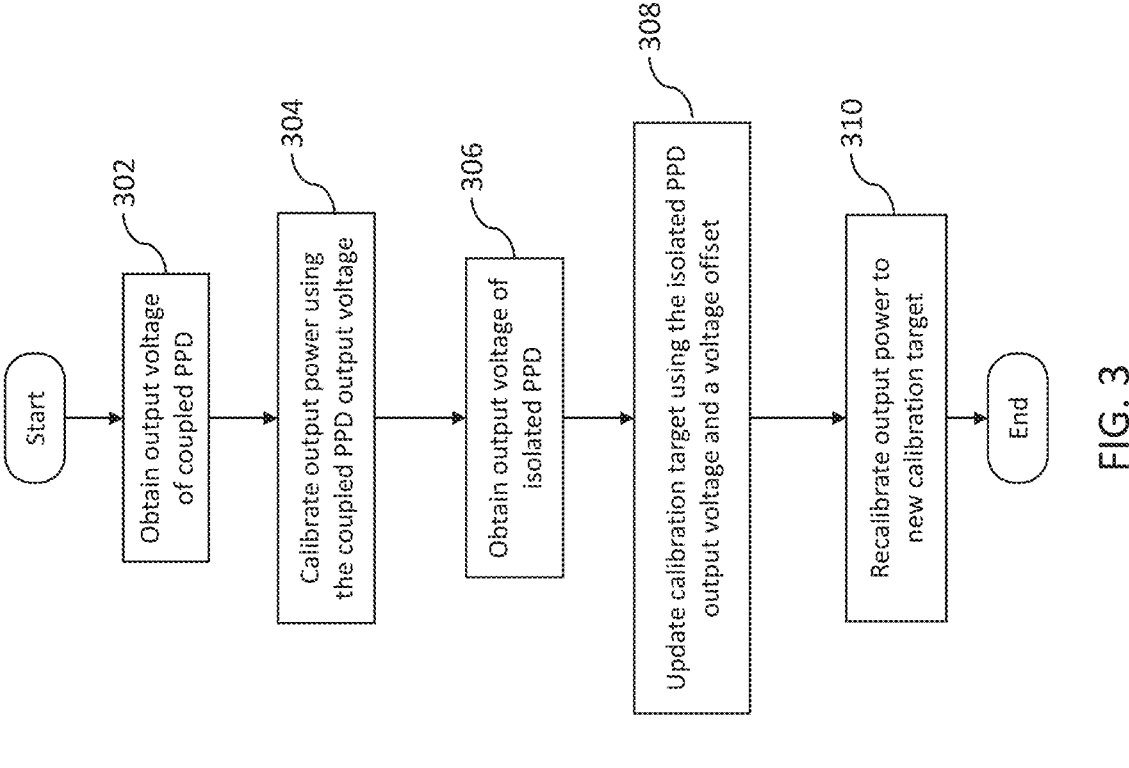
FIG. 3 is a flowchart depicting an example method for radar output power calibration with mismatch compensation, in accordance with the present disclosure.

According to various embodiments, a transmitter of a radar system, such as the radar transmitter embodiments described above, may perform calibration procedures to produce a transmission signal at an output power that is calibrated to optimize signal quality at the transmission antenna; accuracy of the calibration is maximized at the antenna reference plane by compensating a calibration target to account for mismatch (e.g., impedance mismatch and other causes of reflected power) in the transmission signal path. Referring to FIG. 3, an example method 300 of calibrating output power may be performed by a controller, such as a microprocessor executing control logic instructions to measure input signals and generate control signals as outputs. At 302, the controller may obtain an output signal of a coupled detector, such as a coupled PPD as described above. For example, the controller may receive an amplified output signal of a PPD coupled to the coupled port of a bi-directional coupler that receives the output signal of a power amplifier as input; the controller may determine an output voltage or output current of the coupled PPD; this value is proportional to the coupled signal, i.e., a sample of the signal on the coupler's transmission line, which in turn is proportional to the power amplifier output.

At 304, the controller may calibrate the power amplifier output power based on the output of the coupled detector. This output represents a measurement of the incident power level; for example, the detector output voltage read by the controller may correspond to a magnitude of the output power measured approximate the power amplifier output port. The controller may apply any suitable calibration technique based upon the measured value and a stored calibration target. In one embodiment, the stored calibration target may be an expected voltage value that the coupled PPD should produce if the output power is accurately calibrated. In another embodiment, the stored calibration target may be an expected power level, and the controller may be configured to convert the received output voltage to a corresponding measured incident power level and compare it to the stored calibration target. The controller may then generate one or more control signals that cause the supply voltage to the power amplifier gain stage to be increased or decreased to bring the measured value toward the calibration target. This process is iterated until the output power is calibrated with respect to the incident power measurements.

At 306, the controller may obtain an output signal of an isolated detector, such as an isolated PPD as described above. For example, the controller may receive an amplified output signal of a PPD coupled to the isolated port of the bi-directional coupler to which the coupled PPD is coupled; the controller may determine an output voltage or output current of the isolated PPD; this value is proportional to the output signal at the coupler's isolated port, which in turn is proportional to the reflected power on one or both of the coupler's transmission lines. It will be understood that the collection (306) of the isolated PPD output occurs when the transmission signal has an output power level that has been initially calibrated (at 304) with respect to the incident power of the transmission signal. That is, in some embodiments, the reflected power of the transmission signal is measured when the output power level approximates the initial calibration target.

In some embodiments, the output current or output voltage of the isolated detector may not correspond to a direct measurement of the reflected power; the characteristics of the specific coupler and the specific detector must be taken into account. For the coupler, one or more of the coupling factor, the directivity, the insertion loss, and the isolation of the coupler may be relevant to the calibration procedure. The "coupling factor" determines what fraction of the input signal is coupled and delivered to the coupled port (port 284 of coupler 208). "Directivity" refers to how well the coupler differentiates forward-propagating from reverse-propagating portions of the signal, provided the isolated port of the coupler is properly terminated. "Insertion loss" is a measurement of the input power actually delivered to the output port of the coupler, which will be lower than the input power at the input port because the input signal level is reduced by coupling, with some of the input power being delivered to the coupled and isolated ports. "Isolation" is the difference in signal levels between the coupler input port (i.e., port 280 of bi-directional coupler 208 in FIG. 2) and the isolated port (port 286 of coupler 208) when the output port (port 282 of coupler 208) and the coupled port (port 284 of coupler 208) are terminated by matched loads. The isolation of a given coupler is a fixed value, measured in decibels, and is typically in the range of 5 dB to 30 dB or higher. The signal received by the isolated detector will thus have a baseline power level that is determined by subtracting the isolation from the power level at the input port of the coupler. So, for example, if the bi-directional coupler 208 isolation is 33 dB and the power level of the power amplifier 206 output signal received at the coupler 208 input port 280 is 16 dBm, the baseline power level of the signal input to the isolated detector 222 is −17 dBm.

The negative signal level can be accounted for in the calibration procedure by determining a voltage offset for the given detector. In some embodiments, the detector is a PPD and the voltage to use as the offset is determined by applying the PPD's output voltage vs. input power transfer function to the baseline input signal power level of the PPD. The transfer function is a product of the physical properties of the specific PPD used and is typically given on the device data sheet; generally, given a value in dBm, the function converts the value to a corresponding peak voltage. The peak voltage derived from the baseline input signal power level is the voltage offset, and it can be stored in memory of the controller and accessed to perform the calibration.

At 308, the controller may update the calibration target for the power amplifier output power based on the output of the isolated detector and the stored (or calculated) voltage offset. A measurement of the reflected power level is found by subtracting the voltage offset from the isolated detector output voltage; this value is then added to the initial calibration target to produce an updated calibration target that compensates for the reflected power in the signal path when the output power level has been initially calibrated. At 310, the controller may recalibrate the output power using the updated calibration target in the method of step 304. This process is iterated until the output power is calibrated with respect to both the incident and reflected power measurements.

Figure 4:
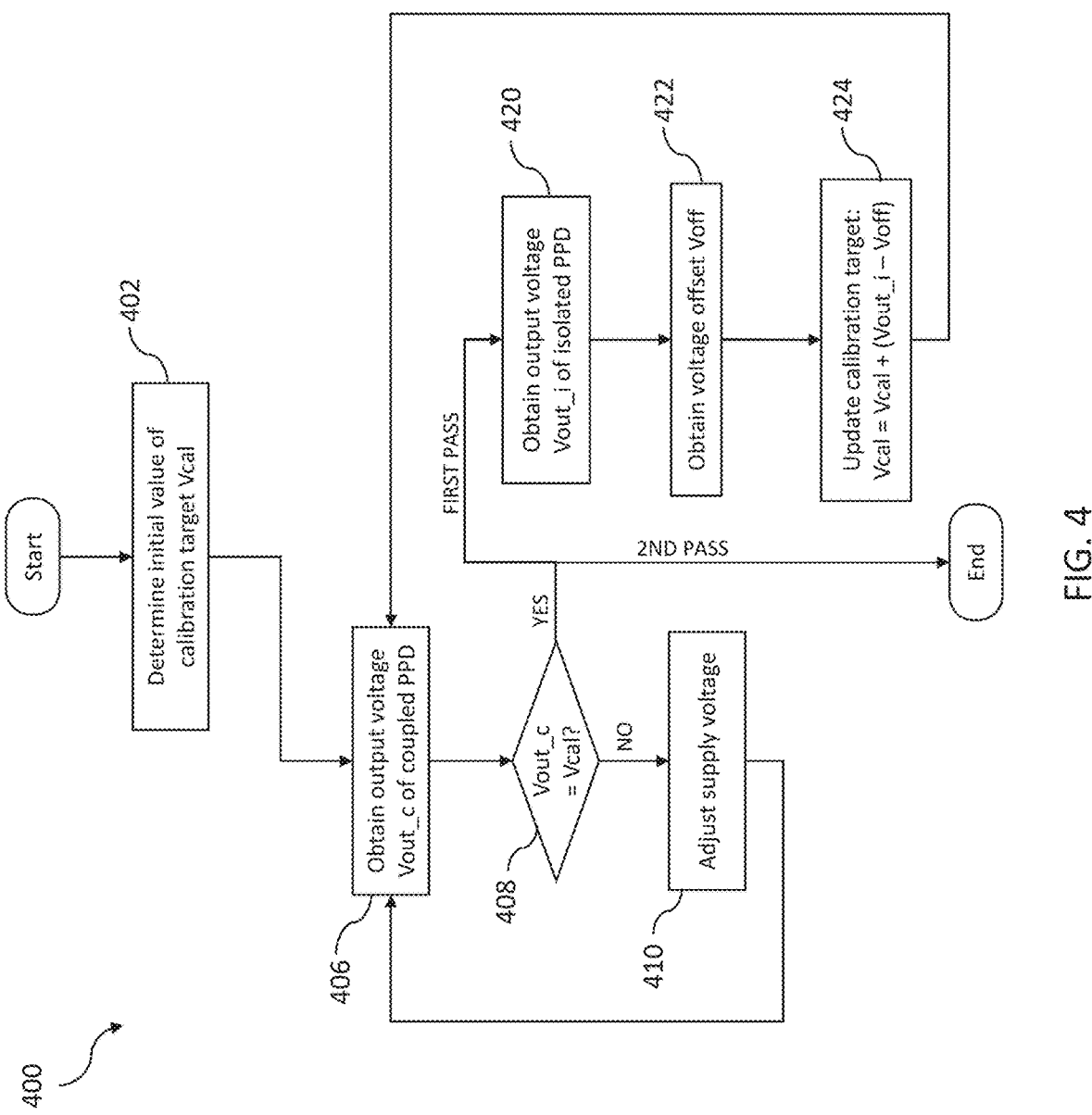
FIG. 4 is a flowchart depicting another example method for radar output power calibration with mismatch compensation, in accordance with the present disclosure.

FIG. 4 presents another example method 400 for power calibration with mismatch compensation, executed by a controller as described above. At 402, the controller may determine an initial calibration target that corresponds to the desired output power level of the transmission signal, measured with respect to the antenna reference plane. The initial value may be stored in memory of the controller. The calibration target value may be a target voltage, a target current, or a target signal level, in various embodiments. In one embodiment, as illustrated, the calibration target is a target voltage (Vcal) of the output signal of a coupled PPD as described above.

A "first pass" of the calibration may then be performed using the initial target Vcal. At 406, the controller may obtain the output voltage (Vout_c) of the coupled PPD. For example, in the device 200 of FIG. 2, the controller 240 receives an amplified coupled PPD output signal from the VGA 230. At 408, the controller compares the measured voltage Vout_c to the calibration target Vcal; if the compared values do not match, at 410 the controller may cause the supply voltage to the gain section of the power amplifier to be adjusted. For example, the controller may generate control signals for a voltage regulator that cause the voltage regulator to increase or decrease the supply voltage to the associated power amplifier components. In turn, this causes the output power level of the power amplifier to move toward the desired power level. The controller then returns to 406 to again measure the couple PPD output voltage Vout_c and, at 408, compare the newly measured value to the calibration target. This process iterates until an initial calibration of the output power level is achieved, at which point Vout_c=Vcal and the controller proceeds from 408 to 420 after the "first pass" calibration.

At 420, while the radar transmitter remains under load (as set in 404), and with the output power level calibrated to the initial value of the calibration target Vcal, the controller may obtain the output voltage (Vout_i) of the isolated PPD. For example, in the device 200 of FIG. 2, the controller 240 receives an amplified isolated PPD output signal from the VGA 230. At 422, the controller obtains a voltage offset Voff. As described above, the voltage offset Voff is calculated based on the physical characteristics of the isolated PPD. The voltage offset Voff may be stored in memory of the device, and retrieved by the controller at 422. At 424, the controller uses the measured output voltage Vout_i and the voltage offset Voff to update the calibration target. Effectively, the new target is equal to the initial target, plus any excess voltage measured by the isolated PPD beyond its own offset amount:

$$Vcal' = Vcal + (\text{Vout\_i} - Voff).$$

The controller may then return to perform a second pass of the calibration steps. At 406, the controller re-acquires the output voltage Vout_c of the coupled PPD, which at this point may still be equal to the initial calibration target. At 408, the controller compares Vout_c to the updated calibration target Vcal' and at 410 adjusts the supply voltage, repeating these steps until Vout_c is calibrated to the new target. Thus, when at 408 the controller determines that Vout_c=Vcal', the output power level has been calibrated to the mismatch-compensated target level, and the calibration procedure is complete.

Figure 5A:
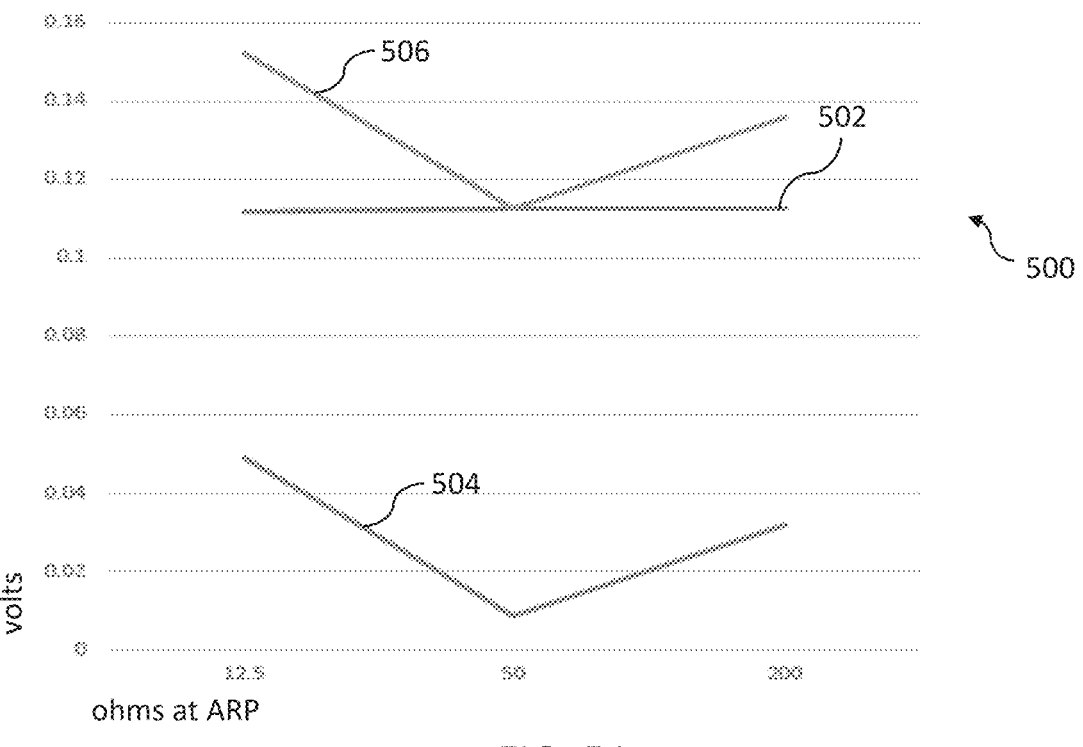
FIG. 5A is a chart depicting detector output voltages in an example simulation of the present calibration devices and methods.
Figure 5B:
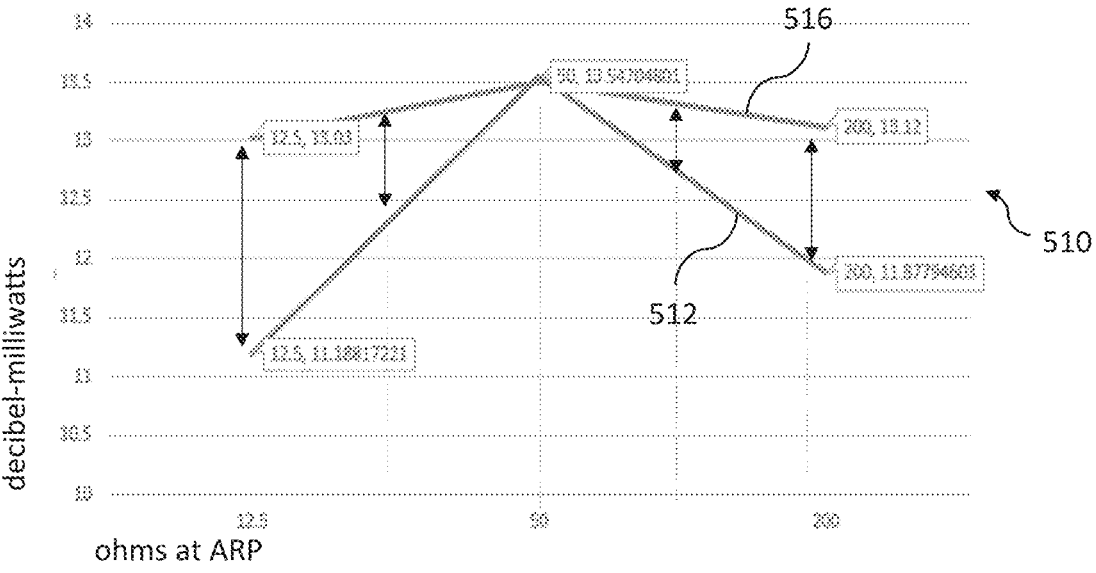
FIG. 5B is a chart depicting calibration results in the example simulation of FIG. 5A.

The data of FIGS. 5A and 5B are provided to demonstrate the efficacy of the present systems and methods of calibrating output power of a radar transmitter. The charts 500, 510 illustrate results of the following simulation: first, the output of the coupled PPD was calibrated with a constant initial calibration target Vcal of 112 mV (equivalent to a signal power level of 13.5 dBm at the ARP) under loads of 12.5 ohms, 50 ohms, and 200 ohms applied at the ARP, shown by plot 502; then, the isolated PPD output voltage was measured under the "ideal" load of 50 ohms to determine the voltage offset of the isolated PPD (alternatively, this value can be stored in memory as described above); then, the isolated PPD output voltage was also measured at 12.5 ohms and 200 ohms, shown by plot 504; an updated calibration target Vcal' was determined based on the initial Vcal, the measurements of isolated PPD output voltage, and the voltage offset, shown by plot 506; finally, the output of the coupled PPD was recalibrated to the updated calibration target Vcal'. The results on chart 510 show the difference in accuracy when calibrating to the target signal level of 13.5 dBm at the ARP, as the load diverges from the ideal load of 50 ohms. The initial calibration plot 512 and the mismatch-compensated calibration plot 514 are equivalently accurate at the ideal load condition, but accuracy of the initial calibration falls much more quickly than the compensated calibration as the load increases or decreases (i.e., deviates from 50 ohms). For this example, after compensation the accuracy of the output power calibration at ARP level is 1.85 dB better for those load conditions; put another way, the largest discrepancy from the target output power of 13.5 dBm before compensation is about 70% and after compensation is about 10%. For lower load variation (25,50,100 Ohms), the improvement in accuracy is still around 1 dB.

The present disclosure describes various implementations of a radar transmitter in a radar system, and of a power amplifier output power calibration procedure that compensates for mismatch between the power amplifier output port and the antenna reference plane of the radar transmitter. In some aspects, the disclosure provides a system for a vehicle radar subsystem. The system includes: a power amplifier configured to generate a first output signal at an output terminal of the power amplifier; a coupler electrically connected to the output terminal of the power amplifier; a first detector electrically connected to a coupled port of the coupler; a second detector electrically connected to an isolated port of the coupler; and, a controller in electrical communication with the power amplifier and the first and second detectors. The coupler is configured to output: at an output port of the coupler, a second output signal that corresponds to the first output signal; at the coupled port of the coupler, a coupled output signal corresponding to a coupled portion of the first output signal coupled within the coupler, the coupled output signal also corresponding to an amount of incident power at an antenna reference plane (ARP) of the vehicle radar subsystem; and, at the isolated port of the coupler, an isolated output signal corresponding to an amount of reflected power at the output terminal of the power amplifier. The first detector is configured to produce a first detector signal responsive to the coupled output signal power level. The second detector is configured to produce a second detector signal responsive to the isolated output signal power level. The controller is configured to execute control logic that causes the controller to: perform an initial calibration comprising controlling the power amplifier to generate the first output signal at a first calibrated power level based on an initial calibration target and the first detector signal; subsequent to the initial calibration, modify the initial calibration target using the second detector signal and an offset associated with one or both of the coupler and the second detector, to produce an updated calibration target; and, perform a compensated calibration comprising controlling the power amplifier to generate the first output signal at a second calibrated power level based on the updated calibration target and the first detector signal.

The coupler may be a bi-directional coupler, and the offset may be based at least in part on an isolation factor of the coupler. The second detector may be a peak-to-peak detector (PPD) having an associated input-power-vs.-output-voltage transfer function; the offset may be determined by attenuating a coupler input power using the isolation factor to determine a second detector input power, and applying the transfer function to the second detector input power to produce the offset. Controlling the power amplifier to generate the first output signal at the first or second calibrated power level may include, while the vehicle radar subsystem is under a first load at the ARP:

for the initial calibration, until the first detector signal has a measured value equal to the initial calibration target, iteratively: receiving the first detector signal; determining the measured value from the first detector signal; determining a first differential between the measured value and the initial calibration target; and, generating control signals that cause a supply voltage of the power amplifier to be adjusted in accordance with reducing the first differential; and for the compensated calibration, until the measured value of the first detector signal is equal to the updated calibration target, iteratively: receiving the first detector signal; determining the measured value from the first detector signal; determining a second differential between the first measured value and the updated calibration target; and, generating control signals that cause the supply voltage of the power amplifier to be adjusted in accordance with reducing the second differential.

The system may further include a low drop-out voltage regulator electrically connected to the controller and to the power amplifier, the voltage regulator configured to receive the control signals from the controller and, responsively, generate the supply voltage corresponding to the control signals and provide the supply voltage to the power amplifier. The power amplifier may include a gain stage having a first driver and a first output stage, and the supply voltage may be provided to the first driver and the first output stage to cause the power amplifier to increase or decrease the output power level of the first output signal. To produce the updated calibration target, the controller is further configured to, while the vehicle radar subsystem is under the first load at the ARP and the power amplifier is generating the first output signal at the first calibrated power level: receive the second detector signal; determine a second measured value from the second detector signal; subtract the offset from the second measured value to produce a compensation value representing the reflected power at the output terminal of the power amplifier; and, add the compensation value to the initial calibration target to produce the updated calibration target.

The system may further include memory accessible by the controller and storing the control logic and the initial calibration target. The memory may further store the offset, and the controller may be configured to obtain the offset from the memory. The controller may be further configured to determine the offset based on the second detector signal received when the vehicle radar subsystem is under an ideal load at the ARP. The controller may set the offset equal to an output voltage of the second detector when the vehicle radar subsystem is under the ideal load.

In another aspect, the present disclosure provides a power calibration section of a radar transmitter configured to produce a transmission signal, the power calibration section including: a power amplifier configured to amplify a calibrated input signal to produce a first output signal at an output terminal of the power amplifier; a coupler electrically connected to the power amplifier; a first detector electrically connected to a coupled port of the coupler; a second detector electrically connected to an isolated port of the coupler; and, a controller in electrical communication with the power amplifier and the first and second detectors. The coupler is configured to receive the first output signal at an input port, and to output: at an output port, a second output signal that corresponds to the first output signal and is transmitted to an antenna reference plane (ARP) of the radar transmitter; at the coupled port, a coupled output signal corresponding to an amount of incident power of the second output signal at the ARP; and, at the isolated port, an isolated output signal corresponding to an amount of reflected power at the output terminal of the power amplifier. The first detector is configured to produce a first detector signal corresponding to the coupled output signal power level. The second detector is configured to produce a second detector signal corresponding to the isolated output signal power level. The controller is configured to execute control logic that causes the controller to: control the power amplifier to produce the first output signal at a first calibrated power level that corresponds to the first detector signal having a first measured value equal to an initial calibration target; while the first output signal is at the first calibrated power level, obtain a measurement of the second detector signal; use the measurement to modify the initial calibration target and produce an updated calibration target; and, control the power amplifier to produce the first output signal at a second calibrated power level that corresponds to the first detector signal having a second measured value equal to the updated calibration target.

To modify the initial calibration target, the controller may be further configured to use, along with the measurement from the second detector signal, an offset associated with one or both of the coupler and the second detector. The coupler may be a bi-directional coupler, the second detector may be an isolated peak-to-peak detector (PPD), and the measurement may be an output voltage of the isolated PPD. The offset may be a voltage offset determined by applying an input-power-vs.-output-voltage transfer function of the isolated PPD to a baseline power level of the isolated output signal. The baseline power level of the isolated output signal may be determined by subtracting an isolation value of the bi-directional coupler from an input power level at the input port of the coupler; the controller subtracts the voltage offset from the measurement to produce a compensation value, and adds the compensation value to the initial calibration target to produce the updated calibration target.

The power calibration section may include one or more variable-gain amplifier (VGA) blocks electrically connected to the first and second detectors and to the controller, the one or more VGA blocks configured to amplify a signal level of each of the first detector signal and the second detector signal before the first and second detector signals are provided to the controller. The power calibration section may include a voltage regulator electrically connected to the controller and to a gain section of the power amplifier, the voltage regulator configured to receive control signals from the controller and, responsively, adjust a supply voltage to the gain section to cause the power amplifier to adjust the first output signal power level toward the first or second calibrated power level.

In another aspect, the present disclosure provides a method including the steps of: receiving a first input signal that corresponds to a measured power level of an output signal of a power amplifier of a vehicle radar system; controlling the power amplifier to iteratively increase or decrease an output power level of the output signal until the output power level reaches a first calibrated output power at which the first input signal matches an initial calibration target; receiving a second input signal that corresponds to a measurement of reflected power at an output port of the power amplifier when the output signal has the first calibrated power level; determining, based on the measurement of the reflected power, a compensation value; adding the compensation value to the initial calibration target to produce an updated calibration target; and, controlling the power amplifier to increase or decrease the output power level of the output signal until the output power level reaches a second calibrated output power at which the first input signal matches the updated calibration target.

Controlling the power amplifier to iteratively increase or decrease the output power level may include the steps of calculating a differential between the first input signal and either the initial calibration target or the updated calibration target, and, iteratively until the differential is zero: generating control signals that cause a supply voltage to a gain section of the power amplifier to be increased or decreased in order to reduce the differential, the change in the supply voltage causing a corresponding change in the output power level of the output signal; receiving the first input signal generated in response to the increased or decreased supply voltage; and, recalculating the differential.

The first input signal may be generated by a first detector electrically connected to a coupled port of a bi-directional coupler that receives, as input, the output signal of the power amplifier; the second input signal may be generated by a second detector electrically connected to an isolated port of the bi-directional coupler, and determining the compensation value may include subtracting an offset from the second input signal to produce the compensation value, the offset being determined by physical characteristics of either or both of the bi-directional coupler and the second detector. The bi-directional coupler may have a fixed isolation factor; the second detector may be a peak-to-peak detector (PPD) having a fixed transfer function that gives a corresponding output voltage of the PPD for each of a plurality of input signal power levels to the PPD; the offset may be a voltage offset given by subtracting the isolation factor from the coupler input power level to produce a baseline PPD input power level, and then applying the transfer function to the baseline PPD input power level to determine the voltage offset; and, determining the compensation value may include determining an isolated output voltage from the second input signal, and subtracting the voltage offset from the isolated output voltage to produce the compensation value.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. Similarly, the description may refer to a left-hand or right-hand bit in one of the present atomic flags. It should be understood that such terms are utilized to provide a clear description of an implementation of the invention and that the various bits of the present atomic flags may be implemented in any order in memory and, in fact, the multiple bits making up the presents atomic flag could be implemented in different regions of a memory or across multiple different memory devices. Similar, the present description may describe a particular memory cell being set when having a signal value greater than a threshold and cleared when the cell's signal value is less than that threshold. It will be apparent to the person of ordinary skill in the art that such definitions may be reversed so that a particular cell may be set when its signal value falls below a threshold and the cell is cleared when its value falls above the same or a different threshold.

The present disclosure makes reference to threshold values and the determination of whether a particular memory cell is set or cleared based upon a comparison of a signal value of the memory cell to such a threshold value. As such, in embodiments, it is described that a memory cell is set when its signal value exceeds the cell's threshold. It should be understood and is expressly contemplated that the concept of "exceeding" a threshold includes the opposite configuration in which a particular memory cell is considered set when its signal value falls below (i.e., exceeds, but in a negative direction) the threshold value. Similarly, references to "falling below" a threshold are expressly contemplated to include implementations in which a particular memory cell is considered cleared when its signal value is above (i.e., falls below, in a negative direction) the threshold value.

The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for a vehicle radar subsystem, the system comprising:

a power amplifier configured to generate a first output signal at an output terminal of the power amplifier;

a coupler electrically connected to the output terminal of the power amplifier, the coupler configured to output:

at an output port of the coupler, a second output signal that corresponds to the first output signal;

at a coupled port of the coupler, a coupled output signal corresponding to a coupled portion of the first output signal coupled within the coupler, the coupled output signal also corresponding to an amount of incident power at an antenna reference plane (ARP) of the vehicle radar subsystem; and at an isolated port of the coupler, an isolated output signal corresponding to an amount of reflected power at the output terminal of the power amplifier;

a first detector electrically connected to the coupled port of the coupler, the first detector configured to produce a first detector signal responsive to the coupled output signal power level;

a second detector electrically connected to the isolated port of the coupler, the second detector configured to produce a second detector signal responsive to the isolated output signal power level; and a controller in electrical communication with the power amplifier and the first and second detectors, the controller configured to execute control logic that causes the controller to:

perform an initial calibration comprising controlling the power amplifier to generate the first output signal at a first calibrated power level based on an initial calibration target and the first detector signal;

subsequent to the initial calibration, modify the initial calibration target using the second detector signal and an offset associated with one or both of the coupler and the second detector, to produce an updated calibration target; and perform a compensated calibration comprising controlling the power amplifier to generate the first output signal at a second calibrated power level based on the updated calibration target and the first detector signal.

2. The system of claim 1, wherein the coupler is a bi-directional coupler and the offset is based at least in part on an isolation factor of the coupler.

3. The system of claim 2, wherein the second detector is a peak-to-peak detector (PPD) having an associated input-power-vs.-output-voltage transfer function, and wherein the offset is determined by attenuating a coupler input power using the isolation factor to determine a second detector input power, and applying the transfer function to the second detector input power to produce the offset.

4. The system of claim 1, wherein controlling the power amplifier to generate the first output signal at the first or second calibrated power level comprises, while the vehicle radar subsystem is under a first load at the ARP:

for the initial calibration, until the first detector signal has a measured value equal to the initial calibration target, iteratively:

receiving the first detector signal;

determining the measured value from the first detector signal;

determining a first differential between the measured value and the initial calibration target; and generating control signals that cause a supply voltage of the power amplifier to be adjusted in accordance with reducing the first differential; and for the compensated calibration, until the measured value of the first detector signal is equal to the updated calibration target, iteratively:

receiving the first detector signal;

determining the measured value from the first detector signal;

determining a second differential between the first measured value and the updated calibration target; and generating control signals that cause the supply voltage of the power amplifier to be adjusted in accordance with reducing the second differential.

5. The system of claim 4, wherein the power amplifier comprises a gain stage comprising a first driver and a first output stage, and wherein the supply voltage is provided to the first driver and the first output stage to cause the power amplifier to increase or decrease an output power level of the first output signal.

6. The system of claim 4, wherein to produce the updated calibration target, the controller is further configured to, while the vehicle radar subsystem is under the first load at the ARP and the power amplifier is generating the first output signal at the first calibrated power level:

receive the second detector signal;

determine a second measured value from the second detector signal;

subtract the offset from the second measured value to produce a compensation value representing the reflected power at the output terminal of the power amplifier; and add the compensation value to the initial calibration target to produce the updated calibration target.

7. The system of claim 1, further comprising a low drop-out voltage regulator electrically connected to the controller and to the power amplifier, the voltage regulator configured to receive the control signals from the controller and, responsively, generate the supply voltage corresponding to the control signals and provide the supply voltage to the power amplifier.

8. The system of claim 1, further comprising memory accessible by the controller and storing the control logic and the initial calibration target.

9. The system of claim 8, wherein the memory further stores the offset and the controller is configured to obtain the offset from the memory.

10. The system of claim 1, wherein the controller is further configured to determine the offset based on the second detector signal received when the vehicle radar subsystem is under an ideal load at the ARP.

11. The system of claim 10, wherein the controller sets the offset equal to an output voltage of the second detector when the vehicle radar subsystem is under the ideal load.

12. A method, comprising:
   receiving a first input signal that corresponds to a measured power level of an output signal of a power amplifier of a vehicle radar system;
   controlling the power amplifier to iteratively increase or decrease an output power level of the output signal until the output power level reaches a first calibrated output power at which the first input signal matches an initial calibration target;
   receiving a second input signal that corresponds to a measurement of reflected power at an output port of the power amplifier when the output signal has the first calibrated power level;
   determining, based on the measurement of the reflected power, a compensation value;
   adding the compensation value to the initial calibration target to produce an updated calibration target; and
   controlling the power amplifier to increase or decrease the output power level of the output signal until the output power level reaches a second calibrated output power at which the first input signal matches the updated calibration target.

13. The method of claim 12, wherein controlling the power amplifier to iteratively increase or decrease the output power level comprises:
   calculating a differential between the first input signal and either the initial calibration target or the updated calibration target; and
   iteratively until the differential is zero:
      generating control signals that cause a supply voltage to a gain section of the power amplifier to be increased or decreased in order to reduce the differential, the change in the supply voltage causing a corresponding change in the output power level of the output signal;
      receiving the first input signal generated in response to the increased or decreased supply voltage; and
      recalculating the differential.

14. The method of claim 12, wherein:
   the first input signal is generated by a first detector electrically connected to a coupled port of a bi-directional coupler that receives, as input, the output signal of the power amplifier;
   the second input signal is generated by a second detector electrically connected to an isolated port of the bi-directional coupler; and
   determining the compensation value comprises subtracting an offset from the second input signal to produce the compensation value, the offset being determined by physical characteristics of either or both of the bi-directional coupler and the second detector.

15. The method of claim 14, wherein:
   the bi-directional coupler has a fixed isolation factor;
   the second detector is a peak-to-peak detector (PPD) having a fixed transfer function that gives a corresponding output voltage of the PPD for each of a plurality of input signal power levels to the PPD;
   the offset is a voltage offset given by subtracting the isolation factor from the coupler input power level to produce a baseline PPD input power level, and then applying the transfer function to the baseline PPD input power level to determine the voltage offset; and
   determining the compensation value comprises determining an isolated output voltage from the second input signal, and subtracting the voltage offset from the isolated output voltage to produce the compensation value.

16. A system for a vehicle radar subsystem, the system configured to:
   receive a first input signal that corresponds to a measured power level of an output signal of a power amplifier;
   iteratively increase or decrease an output power level of the output signal until the output power level reaches a first calibrated output power at which the first input signal matches an initial calibration target;
   receive a second input signal that corresponds to a measurement of reflected power at an output port of the power amplifier when the output signal has the first calibrated power level;
   determine a compensation value based on the measurement of the reflected power;
   add the compensation value to the initial calibration target to produce an updated calibration target; and
   increase or decrease the output power level of the output signal until the output power level reaches a second calibrated output power at which the first input signal matches the updated calibration target.

17. The system of claim 16, wherein the system is configured to iteratively increase or decrease the output power level by:
   calculating a differential between the first input signal and either the initial calibration target or the updated calibration target; and
   iteratively until the differential is zero:
      generating control signals that cause a supply voltage to a gain section of the power amplifier to be increased or decreased in order to reduce the differential, the change in the supply voltage causing a corresponding change in the output power level of the output signal;
      receiving the first input signal generated in response to the increased or decreased supply voltage; and
      recalculating the differential.

18. The system of claim 16, wherein the first input signal is generated by a first detector electrically connected to a coupled port of a bi-directional coupler that receives, as input, the output signal of the power amplifier and the second input signal is generated by a second detector electrically connected to an isolated port of the bi-directional coupler.

19. The system of claim 18, wherein the system is further configured to determine the compensation value by subtracting an offset from the second input signal to produce the compensation value, the offset being determined by physical characteristics of either or both of the bi-directional coupler and the second detector.

20. The system of claim 16, wherein the system is further configured to determine an isolated output voltage from the second input signal, and subtract a voltage offset from the isolated output voltage to produce the compensation value.

\* \* \* \* \*